(12) United States Patent
Zhu et al.

(10) Patent No.: US 8,587,968 B2
(45) Date of Patent: Nov. 19, 2013

(54) CONTROL CIRCUITS AND METHODS FOR SWITCHING MODE POWER SUPPLIES

(76) Inventors: YaJiang Zhu, Shanghai (CN); Jia Xie, Shanghai (CN); Yongbo Zhang, Shanghai (CN); Chao Chen, Shanghai (CN); Shuzhuang Lv, Shanghai (CN)

( * ) Notice: Subject to any disclaimer, the term of this patent is extended or adjusted under 35 U.S.C. 154(b) by 0 days.

(21) Appl. No.: 13/364,269

(22) Filed: Feb. 1, 2012

(65) Prior Publication Data

US 2012/0134182 A1  May 31, 2012

Related U.S. Application Data (63) Continuation of application No. 12/605,081, filed on Oct. 23, 2009, now Pat. No. 8,125,799.

(51) Int. Cl.
*H02M 3/335* (2006.01)
(52) U.S. Cl.
USPC .............. 363/21.12; 363/21.18; 363/21.14
(58) Field of Classification Search
USPC ........ 363/17, 18, 19, 20, 21.01, 21.04, 21.05, 363/21.06, 21.11, 21.12, 21.14, 21.18, 363/21.13
See application file for complete search history.

(56) References Cited

U.S. PATENT DOCUMENTS

| | | | |
|---|---|---|---|
| 5,452,195 A | 9/1995 | Lehr et al. | |
| 5,640,317 A | 6/1997 | Lei | |
| 6,404,654 B1 | 6/2002 | Wang | |
| 6,480,401 B2 | 11/2002 | Tang | |
| 6,674,271 B2 | 1/2004 | Choo et al. | |
| 6,943,535 B1 | 9/2005 | Schiff | |
| 6,980,442 B2 | 12/2005 | Lv et al. | |
| 7,313,004 B1 | 12/2007 | Yang et al. | |
| 7,391,630 B2 | 6/2008 | Acatrinei | |
| 7,876,582 B2 | 1/2011 | Zheng et al. | |
| 7,876,583 B2 * | 1/2011 | Polivka et al. | ............. 363/21.14 |
| 2001/0004204 A1 | 6/2001 | Mitsuaki | |
| 2001/0035554 A1 | 11/2001 | Yamauchi et al. | |
| 2002/0151148 A1 | 10/2002 | Racanelli | |
| 2003/0169606 A1 | 9/2003 | Miermans | |
| 2003/0183924 A1 | 10/2003 | Bhalla et al. | |
| 2005/0169019 A1 | 8/2005 | Konno | |
| 2005/0212501 A1 | 9/2005 | Acatrinei | |
| 2007/0121258 A1 | 5/2007 | Hachiya | |

(Continued)

OTHER PUBLICATIONS

Kassakian, John G., et al., "Principles of Power Electronics;" Form and Function: An Overview, Chapter 2, Section 2.2, Jun. 1992, pp. 11-13.

(Continued)

*Primary Examiner* — Nguyen Tran (57) ABSTRACT

A switching mode power supply (SMPS) includes a transformer having a primary winding, a secondary winding for providing an output voltage, and an auxiliary winding. The SMPS also includes a power switch coupled to the primary winding. A first control circuit is coupled to the secondary winding, and is configured to provide a first electrical signal to the secondary winding when the output voltage of the SMPS is less than a reference voltage during a discontinuous time, whereupon a second electrical signal is induced in the auxiliary winding. A second control circuit is coupled to the auxiliary winding and the power switch. The second control circuit is configured to regulate the output of the SMPS by controlling the power switch in response to a feedback voltage signal from the auxiliary winding, and is further configured to turn on the power switch in response to the second electrical signal.

17 Claims, 9 Drawing Sheets

(56) References Cited

U.S. PATENT DOCUMENTS

| | | |
|---|---|---|
| 2007/0210772 A1 | 9/2007 | Sawtell |
| 2008/0239766 A1 | 10/2008 | Trattler |
| 2008/0259649 A1* | 10/2008 | Marchand et al. ......... 363/21.03 |
| 2008/0310191 A1 | 12/2008 | Zhu et al. |
| 2009/0180302 A1 | 7/2009 | Kawabe et al. |
| 2009/0279333 A1 | 11/2009 | Zhu et al. |
| 2010/0118565 A1 | 5/2010 | Stuler |
| 2010/0208500 A1 | 8/2010 | Yan et al. |
| 2010/0238689 A1 | 9/2010 | Fei et al. |
| 2011/0032732 A1 | 2/2011 | Hsu |

OTHER PUBLICATIONS

Lin et al., "Reduction of Power Supply EMI Emission by Switching Frequency Modulation," IEEE Power Electronics and Drive System Conference 1993; pp. 127-133.

Non-Final Office Action for U.S. Appl. No. 12/248,665, mailed on Aug. 19, 2011, 13 pages.

Non-Final Office Action for U.S. Appl. No. 12/136,760, mailed on Aug. 4, 2011, 24 pages.

Non-Final Office Action for U.S. Appl. No. 12/605,081, mailed on Apr. 21, 2011, 17 pages.

Non-Final Office Action for U.S. Appl. No. 12/421,461, mailed on Feb. 1, 2011, 23 pages.

Notice of Allowance for U.S. Appl. No. 12/605,081, mailed on Oct. 19, 2011, 9 pages.

Notice of Allowance for U.S. Appl. No. 12/421,461, mailed on Jun. 20, 2011, 7 pages.

Stankovich et al., "Analysis and Synthesis of Randomized Modulation Schemes for Power Converters," IEEE Transactions of Power Electronics, vol. 10, No. 6, Nov. 1995, pp. 680-693.

Non-Final Office Action for U.S. Appl. No. 12/136,760, mailed on Apr. 26, 2012, 12 pages.

* cited by examiner

CONTROL CIRCUITS AND METHODS FOR SWITCHING MODE POWER SUPPLIES

CROSS-REFERENCES TO RELATED APPLICATIONS

This application is a continuation application of U.S. patent application Ser. No. 12/605,081, filed Oct. 23, 2009, entitled "CONTROL CIRCUITS OF SWITCHING MODE POWER SUPPLIES" by inventors Yajiang Zhu et al., commonly assigned and incorporated by reference herein for all purposes.

This application is related to U.S. patent application Ser. No. 12/248,665, filed Oct. 9, 2008, entitled "METHOD AND APPARATUS FOR REDUCING STANDBY POWER OF SWITCHING MODE POWER SUPPLIES" by inventors Yajiang Zhu et al., commonly assigned and incorporated by reference herein for all purposes.

This application is also related to U.S. patent application Ser. No. 12/136,760, filed Jun. 11, 2008, entitled "METHOD AND SYSTEM FOR PULSE FREQUENCY MODULATED SWITCHING MODE POWER SUPPLIES" by inventors Yajiang Zhu et al., commonly assigned and incorporated by reference herein for all purposes.

BACKGROUND OF THE INVENTION

The present invention is directed to switching mode power supplies (SMPS). More particularly, embodiments of the invention provide circuits and methods of transferring system output status through the transformer. Merely by way of example, the invention has been applied to control the output voltage undershoot of a pulse width modulated (PWM) or a pulse frequency modulated (PFM) switching mode power supply for reducing the output voltage undershoot of switching mode power supplies during the load transient of the SMPS. But it would be recognized that the invention has a much broader range of applicability.

Switching mode power supplies (SMPS) have the advantages of smaller size, higher efficiency and larger output power capability, and are widely applied in mobile phone chargers, notebook computer adapters and other fields. In recent years, green power supplies are emphasized, which require higher conversion efficiency and especially lower standby power consumption. This leads to the continuous reduction of switching frequency in light load or no load conditions of an SMPS, because lower switching frequency in light load or no load conditions can reduce switching loss of power transistor, thus increase power conversion efficiency and reduce system standby power. However, reducing switching frequency in an SMPS can also lead to many limitations. Some of these limitations are described in more detail below.

In view of the foregoing, there is a need for an effective technique to reduce the output voltage drops during load transients or dynamic load changes of switching mode power supplies.

BRIEF SUMMARY OF THE INVENTION

In accordance with embodiments of the present invention, a variety of techniques are described for transferring system output status through a transformer when the transformer is in a discontinuous conduction mode (DCM) and for reducing the output voltage undershoot during load transient or dynamic load change of switching mode power supplies.

In various embodiments, the present invention provides circuit implementations for communicating system output changes to the primary side through the transformer when the power supply system operates in a discontinuous conduction mode (DCM). In DCM, after the primary winding stores energy during the turn-on period of the power switch and releases the energy to the secondary winding when the power switch is turned off, and there is a time interval that there are no direct currents in all the windings of the transformer. In some embodiments, when the system output voltage is lower than a predetermined value, electrical signals are applied to a secondary winding of the transformer. These electrical signals are communicated to a primary side controller through an auxiliary winding. The primary side controller senses the electrical signals and turns on a power switch coupled in series with a primary winding for a time period. The output voltage drop thus can be reduced during load transients or dynamic load changes of switching mode power supplies.

An embodiment of the present invention provides a switching mode power supply (SMPS) which includes a transformer having a primary winding, a secondary winding for providing an output voltage of the SMPS, and an auxiliary winding. The SMPS also has a first control circuit, a second control circuit, and a power switch coupled to the primary winding. The first control circuit is coupled to the secondary winding, and is configured to provide a first electrical signal to the secondary winding when the output voltage of the SMPS is less than a reference voltage, whereupon a second electrical signal is induced in the auxiliary winding. The second control circuit is coupled to auxiliary winding and the power switch. The second control circuit is configured to provide a control signal to the power switch in response to the second electrical signal.

In an embodiment of the present invention, an integrated circuit (IC) for a secondary side of an SMPS includes a first terminal for coupling to a system output voltage, a second terminal for coupling to a ground potential and a third terminal for coupling to a terminal of the secondary winding of a switching mode power supply. When the system output voltage is below a predetermined value, e.g., 4.7V for a 5V output voltage power supply, the secondary side IC applies a voltage pulse to the terminal of the secondary winding to generate a voltage/current ringing waveform during a discontinuous time of the transformer. This ringing waveform produces an electrical signal at the auxiliary winding, which is then detected by a prime side controller IC. The primary side controller IC turns on the power switch of the switching mode power supply for a time upon detection of the electrical signal. This process continues until the system output voltage is greater than a predefined value, such as 4.7V for a 5V output voltage power supply.

According to an embodiment of the present invention, the primary side controller IC includes a terminal FB for coupling to the auxiliary winding and a terminal OUT for coupling to the power switch. The primary side controller IC receives the electrical signal having a first waveform and a second waveform at terminal FB when the transformer is in the discontinuous time and ignores the first pulse waveform, which may be generated by parasitic components associated with the transformer, rather than the secondary side IC. When the primary side controller identifies that there are ringing signals after the first damping ringing waveforms through the terminal FB, it will turn on the power switch of the switching mode power supply for a time after it receives the ringing signal generated by the IC in the secondary side. Energy is delivered from the primary side to the secondary side. This process continues until the system output voltage is larger than the specified value.

In another embodiment of the present invention, a 3-terminal integrated circuit is provided to sense the system output voltage change and to apply a voltage/current pulse (or a series of pulses) to the secondary winding for the generation of a resonant ringing waveform when the system output voltage is equal to or less than a predetermined value. The 3-terminal IC is powered by the system output voltage. The 3-terminal IC includes an output terminal connected to a terminal of the secondary winding and the anode of a rectifying diode in the secondary side. The 3-terminal IC also includes a switch having one end for coupling to the system output and another end for coupling to the terminal of the secondary winding. In an embodiment, the switch is a PMOS transistor having a source shorted to its body (an N-well) and coupled to the system output voltage, a drain coupled to the anode of the rectifying diode, and a gate coupled to a control block, which is integrated in the 3-terminal IC. When the voltage VCC of the 3-terminal IC is below a predetermined voltage, the control block turns on the PMOS transistor and causes a current flow in the secondary winding. Resonant ringing voltage waveforms will be generated after the PMOS transistor is turned off.

In yet another embodiment of the present invention, a 3-terminal integrated circuit is provided to sense the system output voltage change and to apply a voltage pulse (or a series of pulses) to the secondary winding for the generation of a resonant ringing waveform when the system output voltage is below or equal to a predetermined value. The 3-terminal IC is powered by the system output voltage. The 3-terminal IC includes an output terminal for coupling to a terminal of the secondary winding and the cathode of the rectifying diode in the secondary side. The 3-terminal IC also includes a switch for coupling between the system ground potential and the cathode of the rectifying diode in the secondary winding. In one embodiment, the switch is an NMOS transistor having a source shorted to its body (a P-well substrate) and coupled to the ground potential of the system output, a drain coupled to the cathode of the rectifying diode, and a gate coupled to a control block, which is integrated in the 3-terminal IC. When the VCC output voltage of the 3-terminal IC is equal to or below a predetermined voltage value, the control block will turn on the NMOS transistor and induce a current in the secondary winding. Resonant ringing voltage waveforms will be generated after the NMOS device is turned off.

In still another embodiment of the present invention, the control block of the 3-terminal IC includes resistors forming a voltage divider, a comparator, and a pulse generation circuit, which drives the gate of the PMOS or NMOS transistor.

In the embodiments of the present invention, the control IC in primary side contains a resonant ringing waveform detector circuit configured to skip the first damping resonant ringing waveforms, detect the resonant ringing waveforms generated by the secondary side control IC and turn on the power switch for a specified time upon detection of the resonant ringing waveforms.

In still another embodiment of the present invention, the secondary side IC includes a second comparator for controlling the switch. The second comparator compares the anode voltage and cathode voltage of an integrated diode and turn on the switch if the anode voltage is greater than the cathode voltage for the drain to substrate diode. In one embodiment, the integrated diode is a part of the PMOS or NMOS transistor having the drain being the anode and the source and the bulk substrate being the cathode. The transistor's on-resistance can be made small, whereby the voltage drop across the switch can be lower than 0.5V during the on time of the secondary winding. Then the external rectifying diode can be eliminated, and the power supply conversion efficiency is increased because the switch will dissipate less power than the external rectifying diode, whose forward conduction voltage is about 0.5V. In yet another embodiment, the second comparator is an offset comparator.

An alternative embodiment of the present invention provides a three-terminal device for controlling a switching mode power supply (SMPS). The three-terminal device includes a first terminal for coupling to the output of the switching mode power supply, a second terminal for coupling to a secondary side ground of the switching mode power supply, and a third terminal for coupling to a secondary winding. In a discontinuous mode of the SMPS, the three-terminal device is configured to provide an electric signal to a secondary winding in response to an output condition. In a conduction mode of the SMPS, the three-terminal device is configured to provide a low-voltage drop conduction path for the current in the secondary winding.

In an embodiment of the above three-terminal device, an MOSFET transistor has a drain for coupling to one terminal of the secondary winding and a source for coupling to the ground terminal or the voltage output terminal of the SMPS. The three-terminal device also has a control unit configured to turn on and off the MOSFET.

Another embodiment of the invention provides a method of controlling the output power of a switching mode power supply (SMPS). The SMPS includes a transformer having a primary winding coupled to a power switch, a secondary winding for providing an output, and an auxiliary winding. The method includes detecting a change in the output at the secondary winding, causing a current flow in the secondary winding, and inducing a signal in the auxiliary winding during a discontinuous time of the SMPS. The method also includes applying a control signal to the power switch in response to the induced signal in the auxiliary winding.

In an embodiment of the above method, detecting a change in the output at the secondary winding includes comparing the output with a reference value. In another embodiment, causing a current flow in the secondary winding includes transferring electric charges to the secondary winding upon detecting the change in the power supply output. In another embodiment, applying a control signal to the power switch to the induced signal in the auxiliary winding includes detecting a ringing waveform in the induced signal in the auxiliary winding.

According to another embodiment of the invention, a switching mode power supply (SMPS) includes a transformer having a primary winding for coupling to an input power source, a secondary winding for providing an output voltage of the SMPS, and an auxiliary winding. The SMPS also includes a power switch coupled to the primary winding. A first control circuit in the SMPS is coupled to the secondary winding, and is configured to provide a first electrical signal to the secondary winding when the output voltage of the SMPS is less than a reference voltage during a discontinuous time, whereupon a second electrical signal is induced in the auxiliary winding. A second control circuit of the SMPS is coupled to the auxiliary winding and the power switch. The second control circuit is configured to regulate the output of the SMPS by controlling the power switch in response to a feedback voltage signal from the auxiliary winding. The second control unit is further configured to turn on the power switch in response to the second electrical signal when the output of the SMPS is less than the reference voltage.

In a specific embodiment of the above SMPS, during the discontinuous time, substantially no energy is stored in the primary and secondary windings. In another embodiment, the first electrical signal includes a current pulse in an opposite direction to a secondary current in normal operation of the SMPS. In yet another embodiment, the first electrical signal causes a ringing voltage waveform in the secondary winding after a damping ringing waveform in the secondary winding that follows a secondary current flow induced by a primary current. In a specific embodiment, the second control circuit is configured to detect the ringing waveform in the secondary winding through the auxiliary winding. In yet another embodiment, the second control circuit is configured to ignore the damping ringing waveform when detecting the ringing waveform in the secondary winding through the auxiliary winding.

According to another embodiment of the invention, a device having only three terminals for controlling a switching mode power supply (SMPS) includes a first terminal for coupling to the output of the switching mode power supply for providing power to the three-terminal device, a second terminal for coupling to a secondary side ground of the switching mode power supply, and a third terminal for coupling to a secondary winding of the SMPS. In a discontinuous mode of the SMPS, the three-terminal device is configured to provide a conducting path from the first terminal to the third terminal for providing an electric signal to a secondary winding in response to an output condition.

Various additional embodiments, features, and advantages of the present invention can be appreciated with reference to the detailed description and accompanying drawings that follow.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

As described above, new energy efficiency requirements have led to continued reduction of switching frequency in SMPS. But slower switching frequency in light load or no load conditions results in a slower response to system output load transients from light loads to heavy loads, which can lead to a large system output voltage undershoot during a single load transient, or periodic load transients between no load to full load. As used herein, the term "dynamic load changes" refers to rapid changes in output voltage and/or current at the system output.

Restrain output voltage spike during load transient or dynamic load change within a specific range is often desired in an SMPS. For example, some specifications of mobile phones require that the charger output voltage must be higher than 4.2V when the output current varies within a range from 0 mA to 700 mA. Some notebook computers or LCD TVs may also require that adapters have output voltages that vary less than +/−10 percent of their nominal operating voltage when switching from a sleeping mode to a normal operating mode, and vice versa.

For pulse frequency modulated (PFM) systems, the switching frequency decreases when the load current decreases, and the switching frequency can be about a few hundred Hz in no load conditions for a 30 mW standby power mobile phone charger. For pulse width modulated (PWM) systems, the systems operate in a burst mode under no load conditions, and the PWM controllers do not generate switching signals for tens of milliseconds after outputting a burst of pulses having a minimum pulse width. In both systems, the controllers need a few or tens of milliseconds to increase the switching frequency from a few hundred Hz to tens of kilo Hz (PFM) or change from the burst mode to a maximum duty cycle (PWM).

Figure 1:
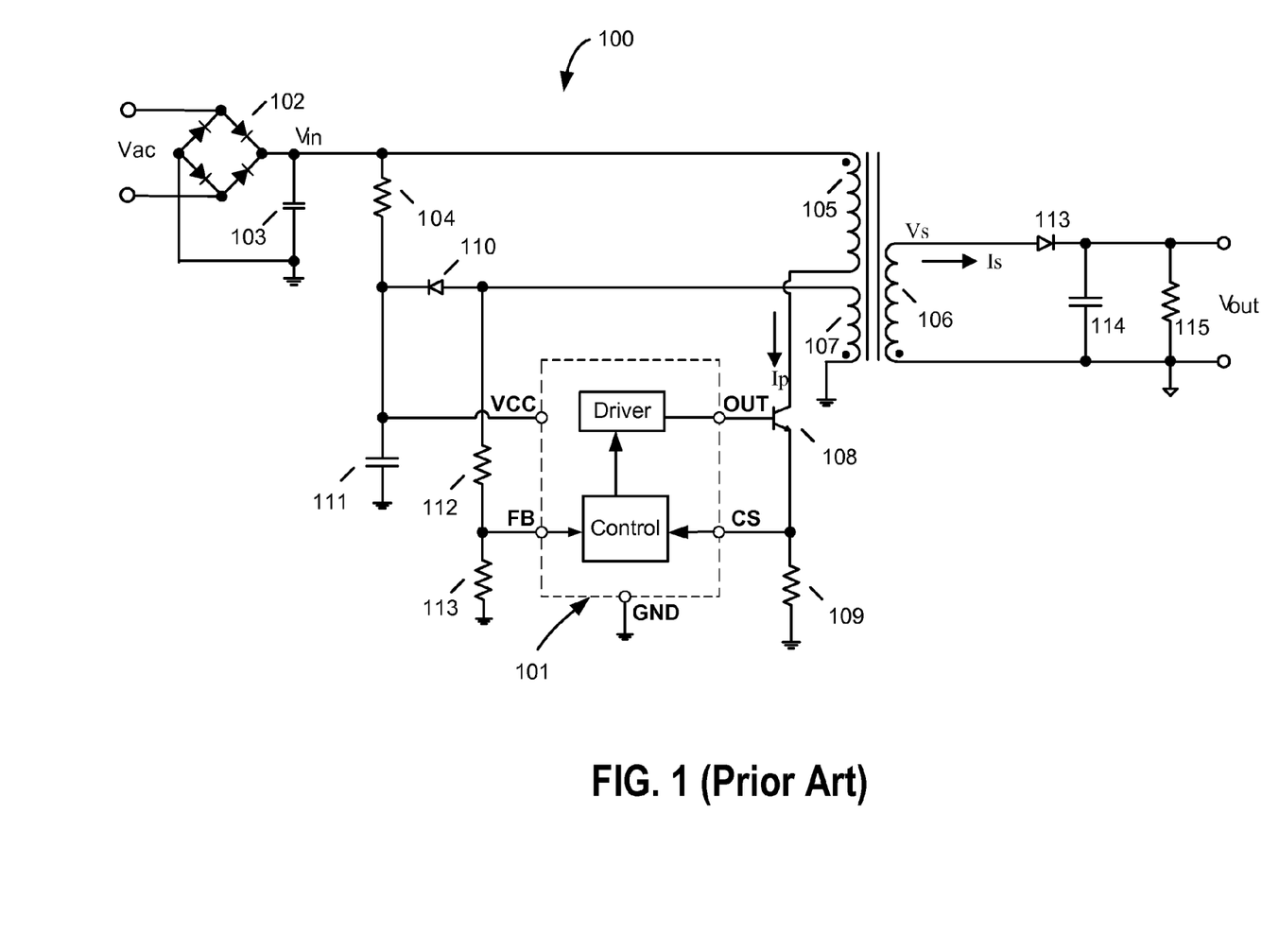
FIG. 1 is a schematic diagram of a conventional primary side regulated switching mode power supply.

FIG. 1 is a simplified block diagram of a conventional switching mode power supply (SMPS) 100. As shown in FIG. 1, SMPS 100 includes a controller 101 with a power supply terminal VCC, a feedback terminal FB, an output terminal OUT, and a current sense terminal CS. Controller 101 can be a PWM controller or a PFM controller. SMPS 100 also includes a transformer that has a primary winding 105, a secondary winding 106 and an auxiliary winding 107. SMPS 100 also includes rectifying diodes 102 that rectify an AC mains voltage source to generate a rectified DC input voltage Vin. The output of the power supply Vout is provided by secondary winding 106 and a rectifying circuit including diode 113 and capacitor 114. The rectified DC input voltage Vin supplies power to controller 101 at the power supply terminal VCC through a resistor 104 and a bypass capacitor 111 at start up. While in the normal operation mode, auxiliary winging 107 supplies power to controller 101 via a rectifier diode 110. Current sense terminal CS is coupled to a terminal of a bipolar transistor 108 to sense a primary current flowing through primary winding 105 and bipolar transistor 108. Controller 101 delivers a control pulse signal at output terminal OUT to turn on and off bipolar transistor 108. Voltages are induced in the auxiliary and secondary windings when transistor 108 is turned off. Resistors 112 and 113 form a voltage divider to reduce the induced voltage at auxiliary winding. The reduced voltage is fed back to controller 101 at input terminal FB for further processing.

The output voltage Vout is regulated by a control block in controller 101, which receives a current signal from a current sense resistor 109 and a voltage signal from resistors 112 and 113. The average value of Vout can thus be controlled by the negative feedback loop formed by the controller 101, power switch 108 and the transformer. However, the transient and dynamic performance of Vout is limited by the bandwidth of the feedback loop in light load conditions, which is in the range of a few hundred Hz. This leads to poor dynamic load response of Vout, as illustrated in FIG. 2.

Figure 2:
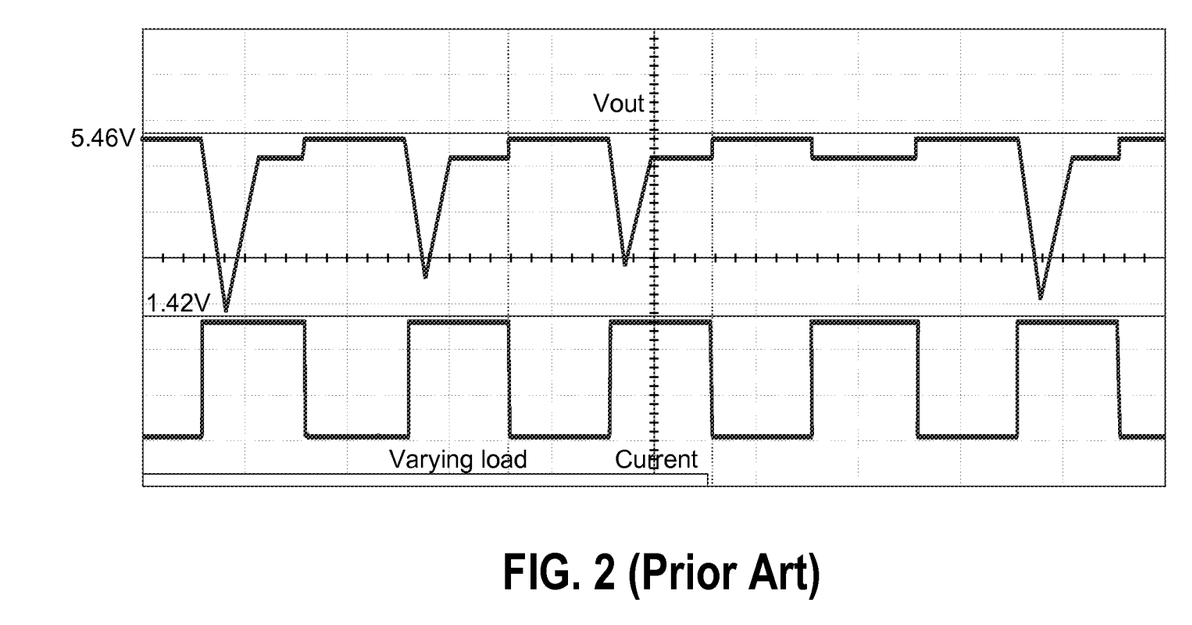
FIG. 2 shows the waveforms of an system output voltage at 50 Hz dynamic load changes of the power supply of FIG. 1.

FIG. 2 shows the waveforms of an system output voltage at 50 Hz dynamic load changes of the power supply of FIG. 1, and illustrates that the long ramp-up time can result in output voltage drops of several volts during a sudden output load change. As shown, the DC output voltage Vout of the secondary winding is about 5.46V at light load conditions, and can drop to about 1.42V as the load increases suddenly.

The voltage drop of the secondary winding is fed back to the primary side controller 101 through auxiliary winding 107 and resistors 112 and 113. Controller 101 then turns on and off transistor 108 to transfer energy from primary winding 105 to secondary winding 106, whereby the output voltage Vout maintains a stable voltage level below 5.46V at a given load. Output voltage Vout reaches again 5.46V when light load conditions return.

Embodiments of the present invention provide methods for enhancing the dynamic performance of the power supplies. In some embodiments, the method includes monitoring the output voltage status and instructing the controller on the primary side to take actions when Vout is below a specified value.

Some embodiments of the invention provide a method of controlling the output power of a switching mode power supply (SMPS), the SMPS including a transformer having a primary winding coupled to a power switch, a secondary winding for providing an output, and an auxiliary winding. The method includes detecting a change in the output at the secondary winding and causing a current flow in the secondary winding, which induces a signal in the auxiliary winding during a discontinuous time of the SMPS. The method also includes applying a control signal to the power switch in response to the induced signal in the auxiliary winding. Further details of the embodiments are provided in the examples described below.

Figure 3:
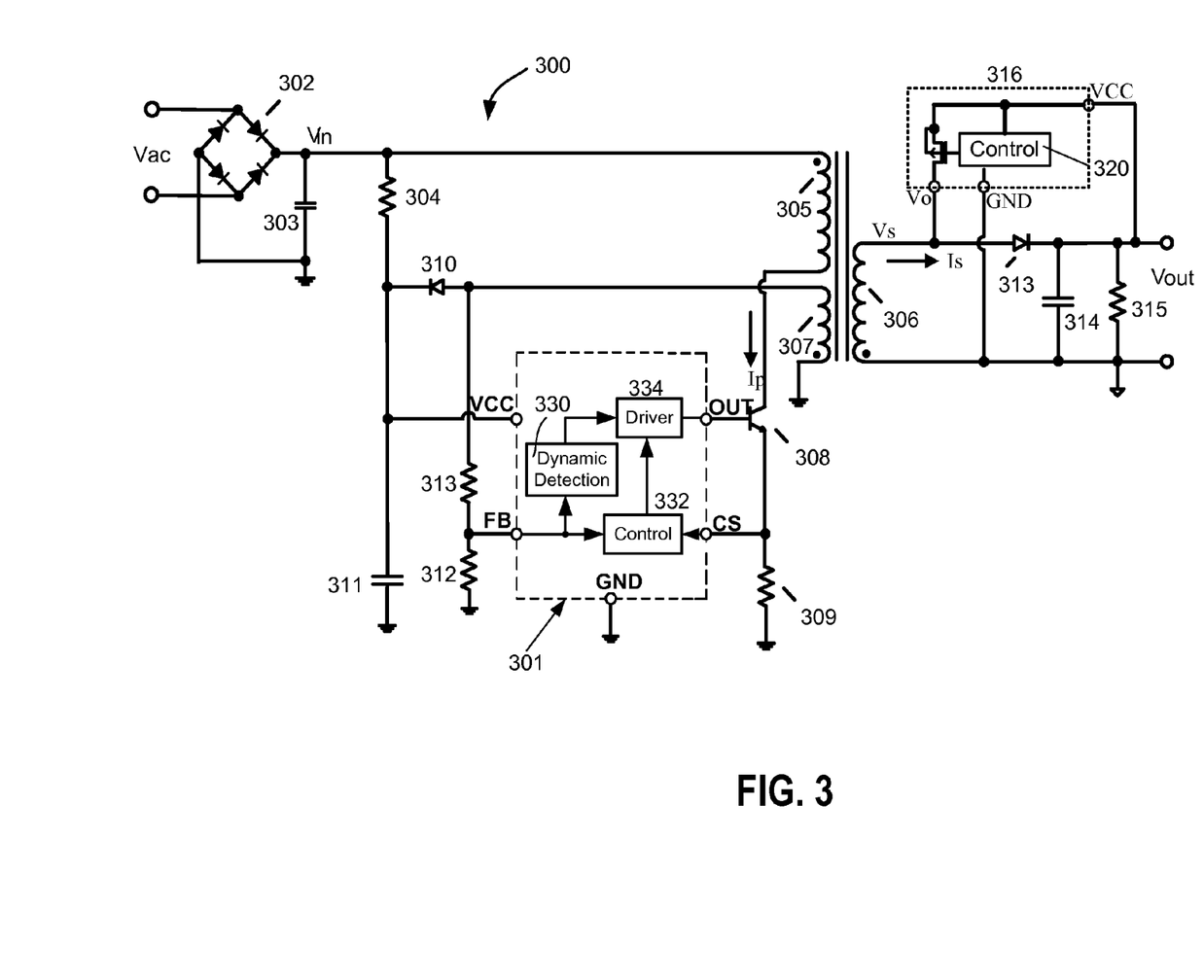
FIG. 3 is a simplified system schematic diagram of an SMPS having a rectifying diode located in the upper side of the secondary winding, in accordance with an embodiment of the present invention.

FIG. 3 is a simplified system schematic diagram of a SMPS having a rectifying diode located in the upper side of the secondary winding, in accordance with an embodiment of the present invention; FIG. 3 shows SMPS 300 configured in a flyback converter topology. System 300 includes a primary winding 305 coupled in series to a power transistor 308, a secondary winding 306, and an auxiliary winding 307. A primary side control circuit 301 receives a voltage signal through a FB input terminal and a current sense signal through a CS input terminal. Control circuit 301 turns on and off power transistor 308 based on the voltage and/or current signals. When power transistor 308 is turned on, a primary current Ip builds in primary winding 305, which stores energy. The energy stored in primary winding 305 is transferred to secondary winding 306 during the turn-off time interval of power transistor 308. A rectifier element 313 and a smoothing capacitor 314 in secondary winding 306 converts a secondary voltage Vs into a DC system voltage Vout to supply to a load 315. System output voltage Vout is monitored by a secondary side controller circuit 316. Controller circuit 316 includes an input terminal VCC, an output terminal Vo, and a GND terminal, which is connected to the ground potential of the system output Vout. Terminal VCC is coupled to output voltage Vout, and terminal Vo is coupled to one end of the secondary winding. System 300 can operate in a discontinuous conduction mode (DCM) in no load or light load conditions, i.e., the energy in primary winding 305 and secondary winding 306 can drop to zero. These are time intervals during which there are no direct currents in the primary winding, the secondary winding and the auxiliary winding of the transformer. These time intervals can be used to transfer Vout change information without additional system overhead. The change information of output voltage Vout is sent by control circuit 316 in the secondary side, and received by control circuit 301 in the primary side.

In an embodiment, secondary side control circuit 316 includes a control circuit 320 and a switch. Control circuit 320 turns on the switch when system output voltage Vout is below a predetermined value. Further details of control circuit 316 are described below in connection with FIGS. 5A and 5B.

Primary side control circuit 301 includes a dynamic event detection circuit 330 connected between the FB terminal and a driver block 334. Dynamic event detection circuit 330 is connected in parallel with a conventional voltage control loop 332 and provides the ability to primary control circuit 301 to respond to rapid changes in load variations.

Figure 4:
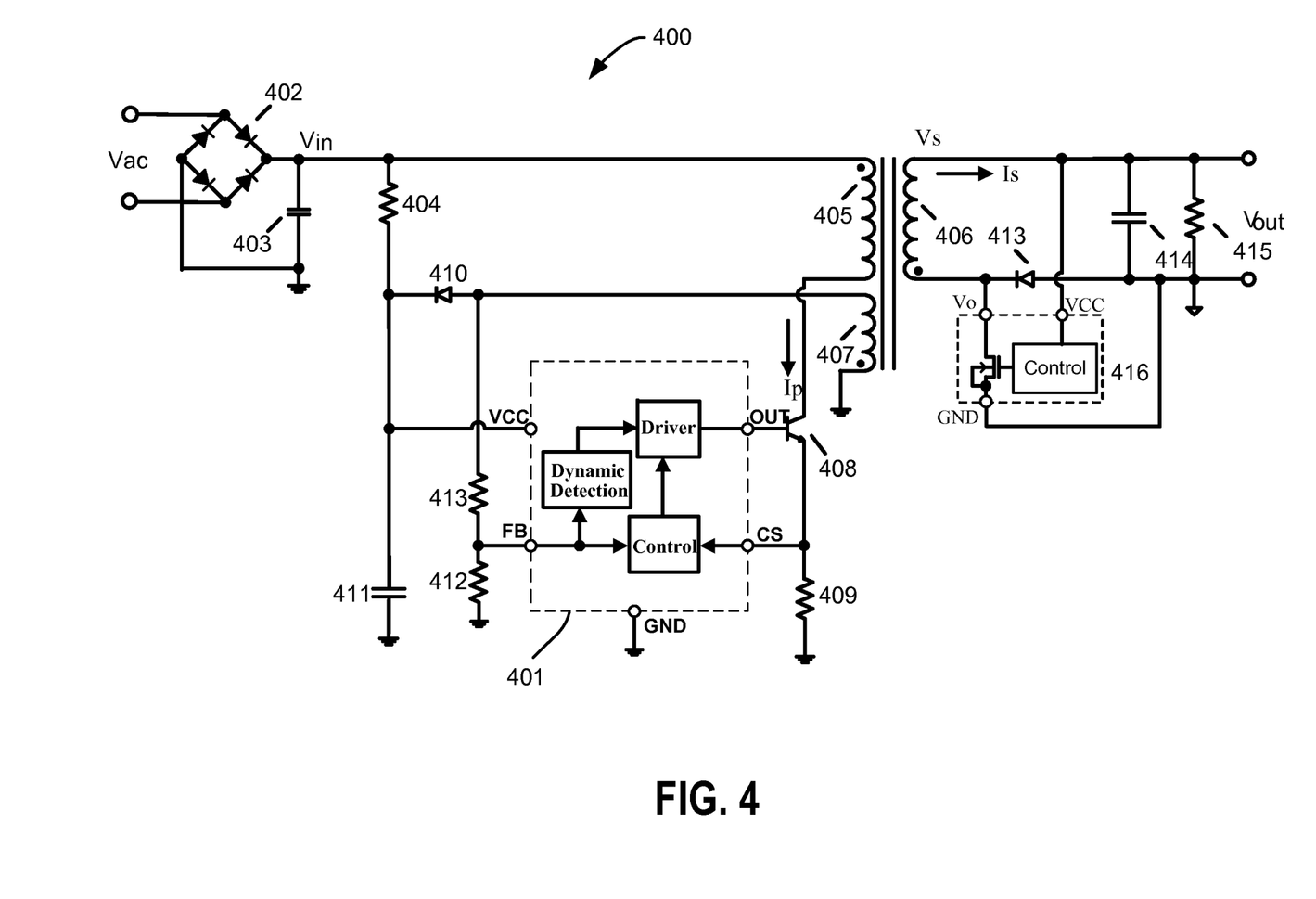
FIG. 4 is a simplified system schematic diagram of an SMPS having a rectifying diode located in the lower side of the secondary winding, in accordance with an embodiment of the present invention.

FIG. 4 is a simplified system schematic diagram of an SMPS having a rectifying diode located in the lower side of the secondary winding, in accordance with an embodiment of the present invention. As shown, a rectifier element 413 is connected in the lower side of the secondary winding. In this case, an output pin Vo of a secondary side control circuit 416 is also connected to the lower side of the secondary winding. Primary side control circuit 401 is the same as control circuit 301 of FIG. 3. Secondary side control circuit 416 will be described in detail in the following sections.

Figure 5A:
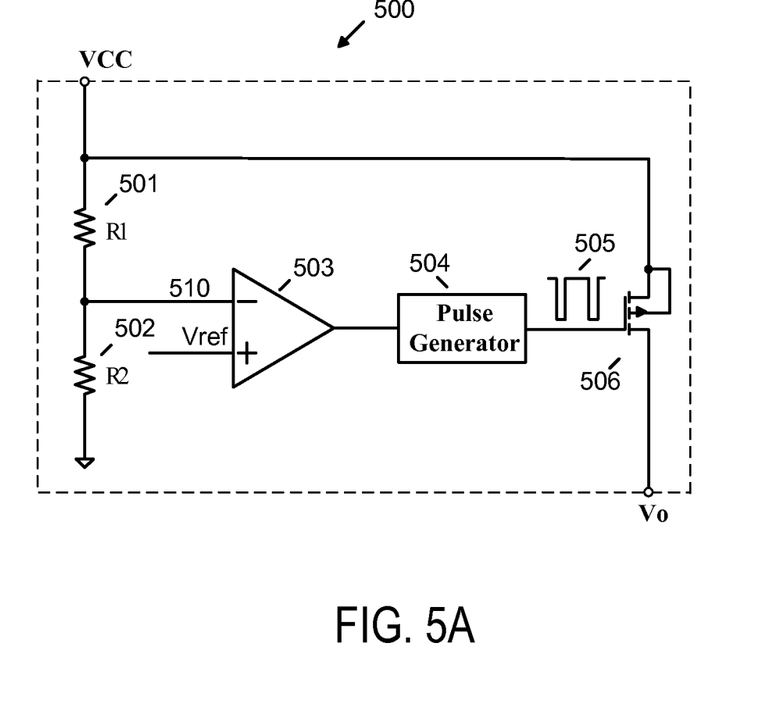
FIG. 5A is a simplified block diagram illustrating a control IC for a secondary side of a SMPS according to an embodiment of the present invention.

FIG. 5A is an exemplary circuit diagram of a change information transfer block 500 that could be used as secondary side controller circuit 316 of FIG. 3 in accordance with one embodiment of the present invention. Change information transfer block 500 includes a terminal VCC for coupling to output voltage Vout and a terminal Vo for coupling to an end of secondary winding 306. Voltage Vout (at terminal VCC in FIG. 5A) is coupled to a voltage divider formed by resistors 501 and 502. Attenuated voltage 510 is applied to a terminal of a comparator 503. Comparator 503 compares voltage 510 with an internal reference voltage Vref to sense a change at system output voltage Vout. If the attenuated Vout is below the reference voltage Vref, comparator 503 will output a high logic state, which triggers a pulse generator 504 to generate a pulse or a series of pulses 505. Pulse(s) 505 then turns on a switch 506. Switch 506, when turned on, will transfer a portion of the electric charge stored at capacitor 314 to secondary winding 306 (FIG. 3). The transferred electric charge causes a current flow in secondary winding 306. Hence, any dynamic change at output voltage Vout can be communicated to the primary side while the transformer is in a discontinuous mode (DCM) state. When switch 506 is turned off, the current at secondary winding 306 will go back to zero; an oscillation or resonant ringing waveform at a frequency determined by the parasitic inductance and capacitance will occur in secondary winding 306, and resonant ringing waveform having similar shapes also appears in auxiliary winding 307. Primary side controller 301 (FIG. 3) detects this ringing waveform and turns on and off power switch 308 to transfer energy from primary winding 305 to secondary winding 306. In one embodiment of the present invention, switch 506 is a PMOS transistor.

Figure 5B:
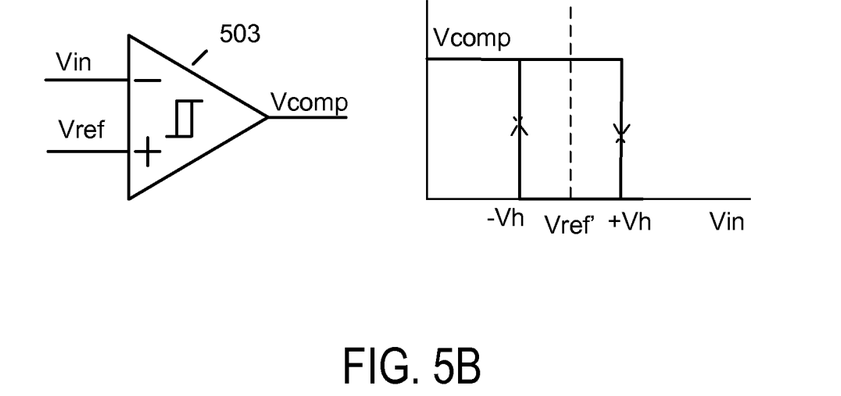
FIG. 5B is a simplified circuit diagram of a comparator having built-in hysteresis, in accordance with an embodiment of the present invention.

In an embodiment, comparator 503 can be a comparator having a hysteresis. The hysteresis can prevent noise signals occurring at VCC from triggering a change of logic states at the comparator output. As shown in FIG. 5B, comparator 503 may include a hysteresis generation circuit to form a hysteresis of +/−Vh centered at Vref'.

Figure 6:
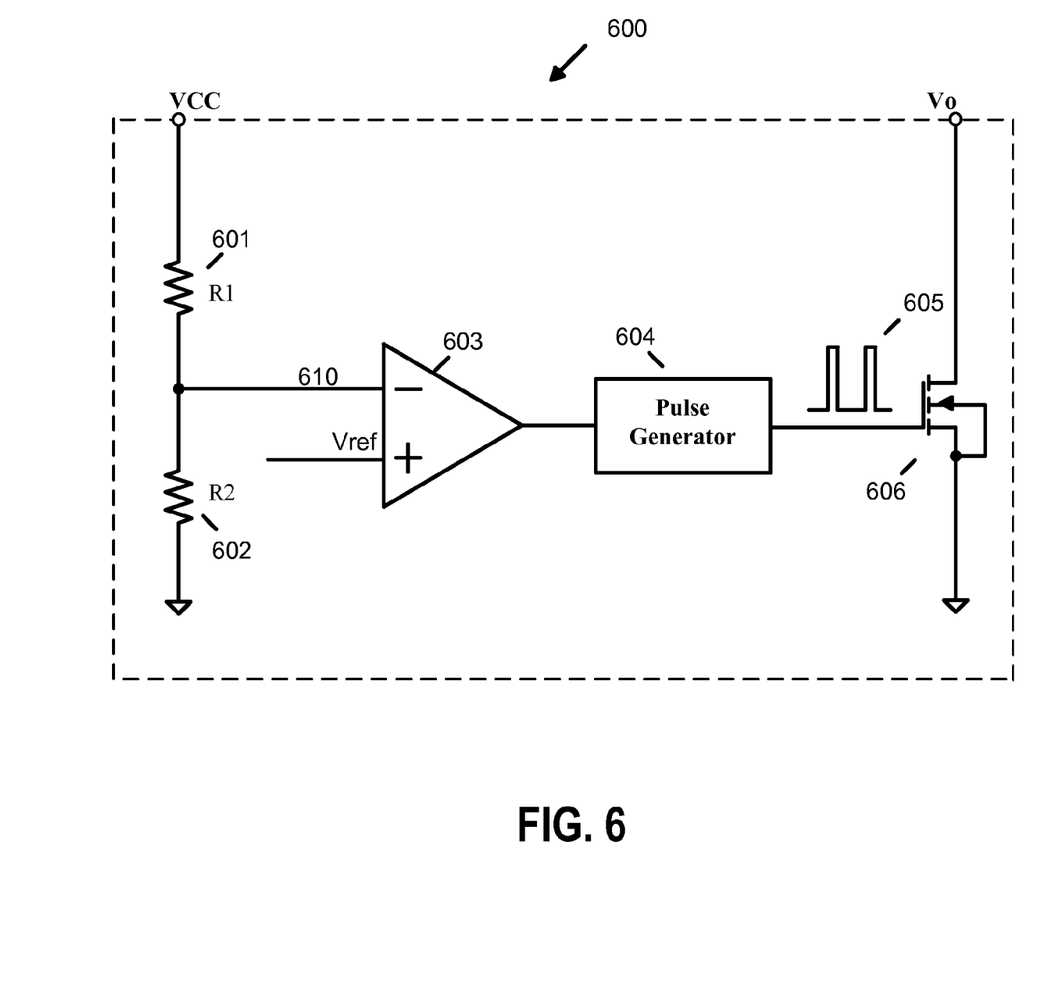
FIG. 6 is a simplified block diagram illustrating a control IC in the secondary side according to another embodiment of the present invention.

FIG. 6 is a simplified block diagram illustrating a control IC in the secondary side according to another embodiment of the present invention. FIG. 6 shows an exemplary implementation of secondary side controller circuit 416 of FIG. 4 in accordance with another embodiment of the present invention. Change information transfer block 600 includes a terminal VCC for coupling to smoothing capacitor 414, a terminal Vo for coupling to a terminal of secondary winding 406, and a ground terminal for coupling to a ground potential of the secondary side voltage output. Change information transfer block 600 includes a voltage divider formed by resistors 601 and 602 to attenuate voltage Vout that is applied at terminal VCC. A comparator 603 compares an attenuated voltage 610 with an internal reference voltage Vref and generate a control signal when the attenuated voltage is equal to or less than the reference voltage. A pulse generator 604 generates at least one pulse when triggered by the control signal. Pulse generator 604 is similar to pulse generator 504 of FIG. 5, and both can be a one-shot pulse generator or a multivibrator oscillator, etc. A switch 606 is coupled between the ground terminal and terminal Vo. The pulse turns on and off switch 606 that, when turned on, transfer a portion of the electric charge stored in capacitor 414 to secondary winding 406. In one embodiment of the present invention, switch 606 is an NMOS transistor having source and substrate connected to the ground potential of output voltage Vout.

Further details of the operation of a conventional SMPS and embodiments of the present invention are described with reference to the waveform diagrams in FIGS. 7 and 8.

Figure 7:
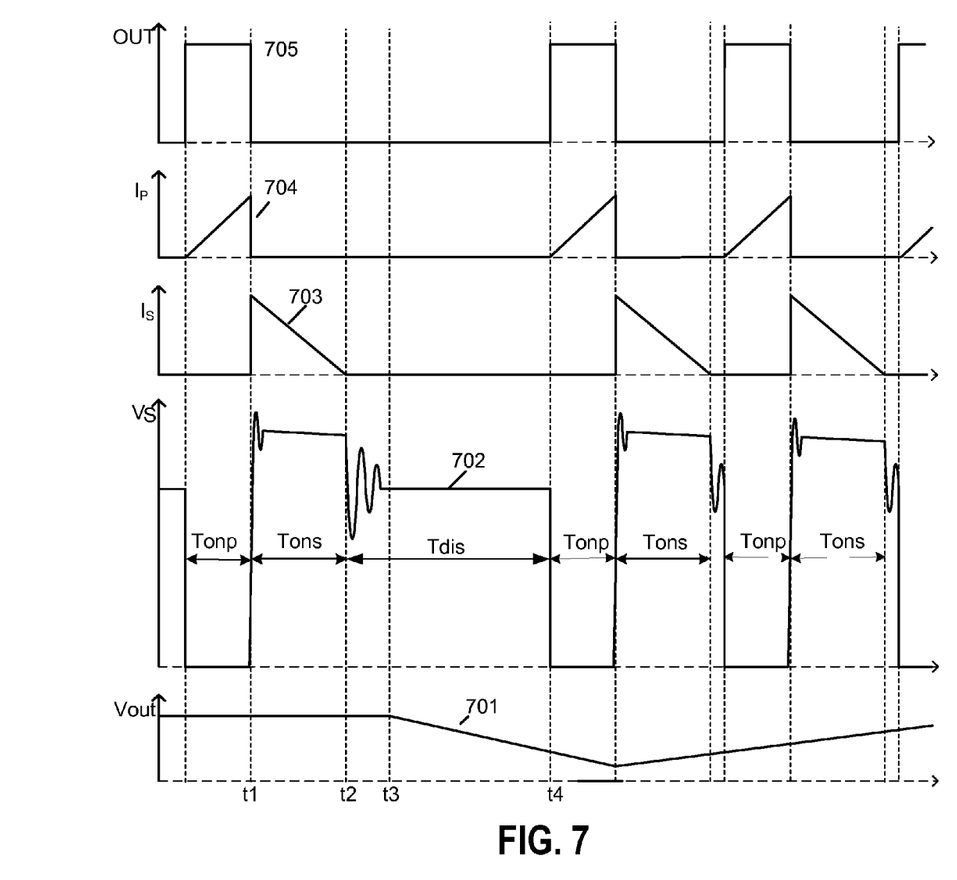
FIG. 7 shows the waveforms of the conventional SMPS of FIG. 1, where the discontinuous time Tdis is large, resulting in a Vout drop during dynamic load changes.
Figure 8:
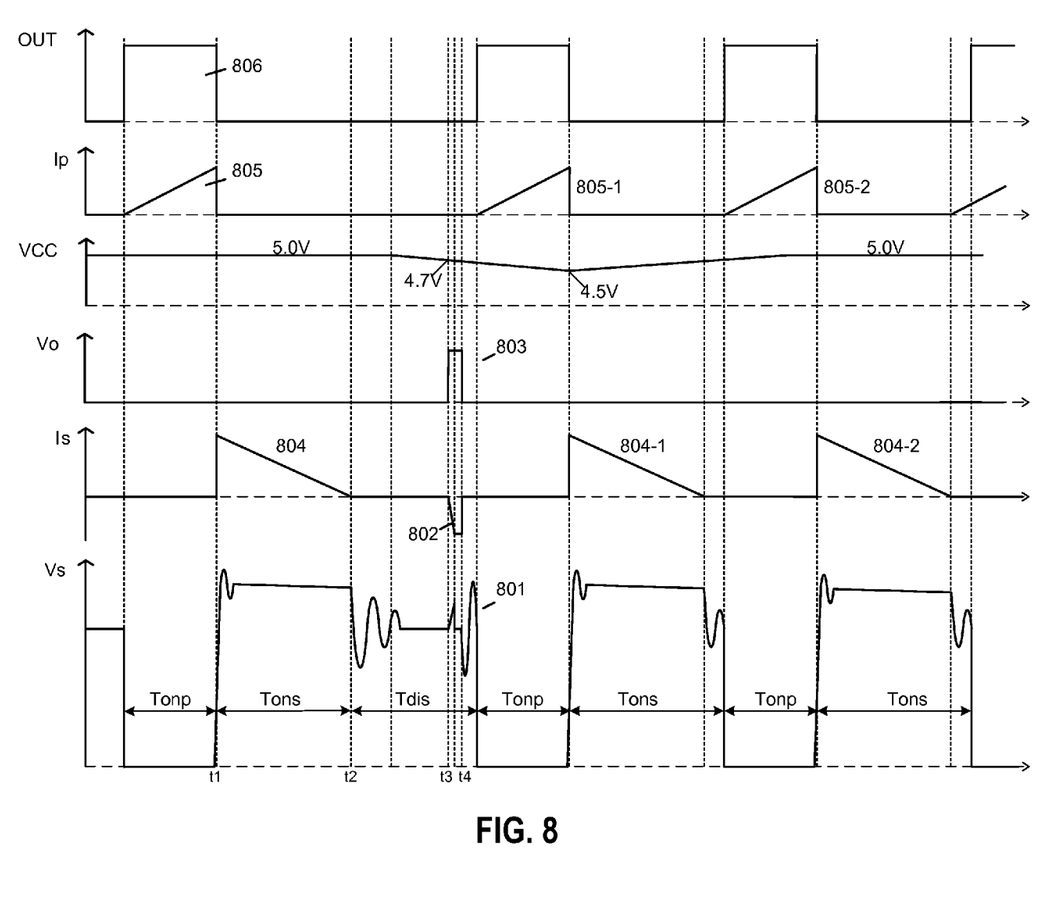
FIG. 8 shows the waveforms of the SMPS according to embodiments of the present invention, where the discontinuous time Tdis is reduced, resulting in a much smaller Vout drop during dynamic load changes.

FIG. 7 illustrates exemplary simplified voltage and current waveforms of a conventional SMPS of FIG. 1. OUT 705 is the switching signal of the primary side controller 101 for turning on transistor 108. While transistor 108 is turned on (corresponding to time interval Tonp), primary side current Ip 704 ramps up linearly from 0 to its maximum value, and primary winding 105 stores magnetic energy. Secondary side winding voltage Vs is negative and diode 113 is reversed biased while transistor 108 is turned on. When transistor 108 is turned off at time t1, primary winding 105 releases the stored energy to secondary winding 106, Vs goes to a positive peak value (with some overshoots), secondary current Is 703 charges capacitor 114 and goes to zero at time t2. At t2, a damped ringing waveform occurs at Vs with a resonant frequency determined by the parasitic inductance and capacitance of the secondary winding and lasts till t3. The SMPS operates in the discontinuous conduction mode (DCM) at the time interval between t2 and t4, where there is no energy stored in primary and secondary windings. Depending on the load conditions, Vout starts drooping while the SMPS is in the DCM state. Power switch 108 will be turned on again by controller 101 after a discontinuous time Tdis based on the feedback loop. In light load or no load conditions, Tdis can be in the range of about a few to about tens of milliseconds. If load transient or load dynamic occurs during the long Tdis time, especially after the non-conduction of rectifying diode 113 (FIG. 1) such as at instant t2 in FIG. 7, output voltage Vout may droop for milliseconds, resulting in a Vout drop (to 1.42V), as also illustrated in FIG. 2.

The Vout drop can be significantly reduced according to an embodiment of the present invention. FIG. 8 shows exemplary simplified voltage and current waveforms of switch control signal and current of primary winding, output signal of secondary side control circuit, and current and voltage of secondary winding, with reference to SMPS 300 of FIG. 3. Out 806 is the switching signal of transistor 308. Ip 805 is the primary switch current of primary winding 305. Voltage Vo 803 is the voltage pulse at output terminal Vo of secondary side control circuit 316 (FIGS. 3 and 5), which is generated when Vout (corresponds to VCC in FIG. 8) is below a reference voltage (e.g., 4.7V for a 5V output system). Is 804 is the current flowing across diode 313 during the conduction time Tons (between t1 and t2) of secondary winding 306. Is 802 is the current pulse flowing in the secondary winding while voltage pulse 803 is present (between t3 and t4). When current pulse Is 802 goes to zero at t4, a ringing waveform 801 is generated in the secondary and auxiliary windings.

Ringing waveform 801 in the secondary winding is fed back to the FB input of primary side controller 301 through the auxiliary winding and detected by dynamic event detection circuit 330 (FIG. 3). In an embodiment, detection circuit 330 receives the electrical signal having a first waveform and a second waveform at terminal FB when the transformer is in the discontinuous time and is configured to ignore the first pulse waveform, which may be generated by the parasitic components associated with the transformer, rather than the secondary side IC. Detection circuit 330 can be implemented, for example, using conventional circuit design techniques. Upon the detection of a dynamic change event at output voltage Vout, control circuit 301 turns on power switch 308 to store and transfer energy from the primary side to the secondary side, as indicated by the successive Ip waveforms 805-1, 804-1, 805-2, and 804-2 after the detection of the ringing waveform. Vout (equals to VCC in FIG. 8) begins to increase, and thus results in a Vout voltage drop to about 4.5V, compared with Vout dropping to about 1.4V in the conventional system of FIG. 1 and FIG. 2.

Figure 9:
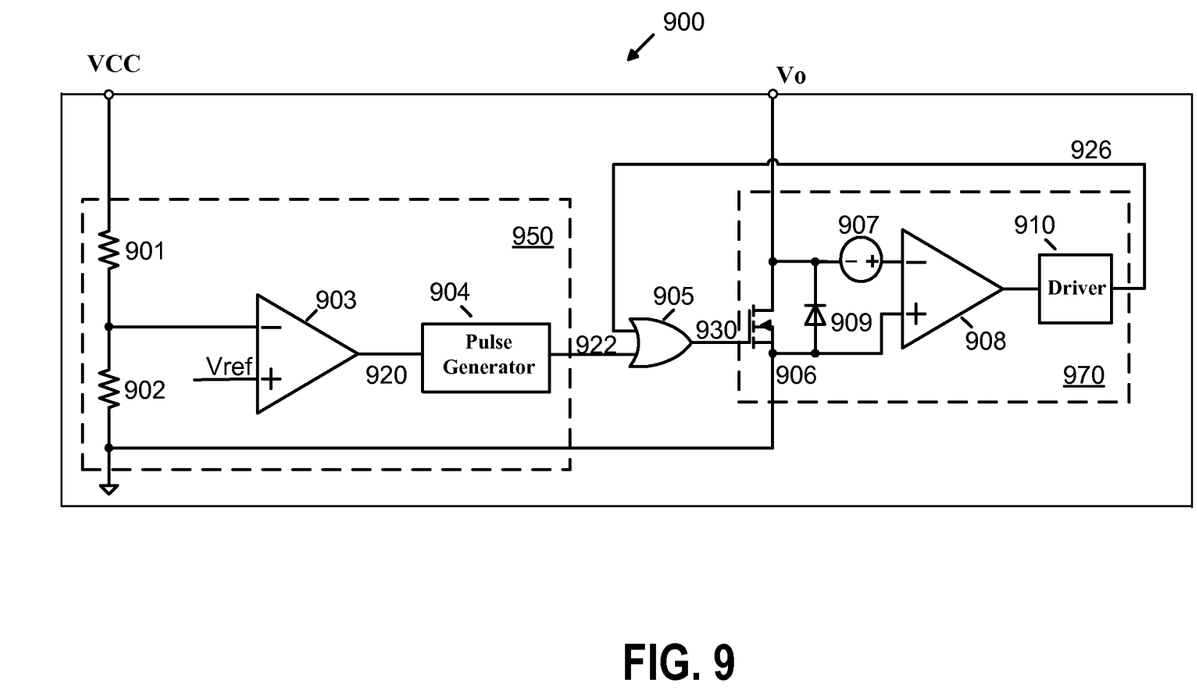
FIG. 9 is a schematic diagram of an embodiment of a secondary side control IC having a MOSFET switch replacing the external rectifying diode in the secondary winding, in accordance with an embodiment of the present invention.

The secondary side control circuit can also include active rectification in the secondary winding according to an embodiment of the present invention. FIG. 9 is a simplified schematic diagram of an integrated circuit 900 that can replace control circuit 416 including diode 413 (FIG. 4). Integrated circuit 900 includes an input terminal VCC for coupling to output voltage Vout, an output terminal Vo for coupling to a terminal of second winding, and a ground terminal for coupling to a ground potential of output voltage Vout. Integrated circuit 900 further includes a MOSFET transistor having a drain coupled to output terminal Vo and a source coupled to the ground terminal. In addition, Integrated circuit 900 includes a control unit that turns the MOSFET transistor on and off.

In one embodiment, the control unit includes a first control circuit 950 to turn on the MOSFET for a time period when output voltage Vout is equal to or less than an internal reference voltage. The control unit also includes a second control circuit 970 to turn on the MOSFET during a conduction time of the second winding. In one embodiment, the conduction time is determined by a current Is flowing through secondary winding 406. The control unit further includes a logic gate 905 that wires outputs 922 and 926 of the respective first and second control circuits into a single control signal 930 for switching the MOSFET transistor.

In one embodiment of the present invention, first control circuit 950 includes a voltage divider formed by resistors 901 and 902 to attenuate voltage Vout (at terminal VCC). A comparator 903 compares the attenuated voltage with the internal reference voltage to produce a comparison result 920. In one embodiment, comparison result 920 is at logic high when the attenuated voltage is equal to or less than the reference voltage. A pulse generator 904 generates at least one pulse 922 when the comparator is at logic high. Pulse 922 turns on the MOSFET via logic gate 905.

In one embodiment of the present invention, the second control circuit 970 includes a comparator 908 having a positive input coupled to the source or the bulk substrate of the MOSFET and a negative input coupled to the drain of the MOSFET through an offset voltage source 907. Offset voltage source 907 ensures that comparator 908 generates a turn-off signal during the discontinuous time of the transformer. A diode 909 is connected across the source and drain of the MOSFET with the anode coupled to the source and the cathode coupled to the drain. Upon the turning off of power switch 408 in the primary side, the anode voltage of diode 909 will be higher than its cathode voltage. The output of comparator 908 will be high to turn on switch 906 via logic gate 905. If the size of MOSFET 906 is sufficiently large, its on-resistance will be small, the maximum voltage drop across the switch can be smaller than 0.5V during the on time of the secondary winding.

In one embodiment, the discrete rectifying diode 413 in FIG. 4 can be eliminated, and power supply conversion efficiency is increased due to less power dissipation on the MOSFET transistor compared with discrete rectifying diode 413, whose forward conduction voltage is around 0.5V.

In one embodiment, the offset voltage source is programmable since its effect is to raise or lower the voltage level at which comparator 908 will switch from one state to the other.

The above description is illustrative and not restrictive. Many variations of the invention will become apparent to those skill in the art upon review of this disclosure. The scope of the invention should, therefore, not be limited the above description.

What is claimed is:

1. A switching mode power supply (SMPS), comprising:
   a transformer having:
      a primary winding for coupling to an input power source;
      a secondary winding for providing an output voltage of the SMPS; and
      an auxiliary winding;
   a power switch coupled to the primary winding;
   a first control circuit coupled to the secondary winding, the first control circuit being configured to provide a first electrical signal to the secondary winding when the output voltage of the SMPS is less than a reference voltage during a discontinuous time, whereupon a second electrical signal is induced in the auxiliary winding; and
   a second control circuit coupled to the auxiliary winding and the power switch, the second control circuit being configured to regulate the output of the SMPS by controlling the power switch in response to a feedback voltage signal from the auxiliary winding, the second control circuit being further configured to turn on the power switch during the discontinuous time in response to the second electrical signal when the output of the SMPS is less than the reference voltage;
   wherein the first electrical signal causes a ringing voltage waveform in the secondary winding after a damping ringing waveform in the secondary winding that follows a secondary current flow induced by a primary current.

2. The switching mode power supply of claim 1 wherein during the discontinuous time, substantially no energy is stored in the primary and secondary windings.

3. The switching mode power supply of claim 1 wherein the first electrical signal comprises a current pulse in an opposite direction to a secondary current in normal operation of the SMPS.

4. The switching mode power supply of claim 1 wherein the second control circuit is configured to detect the ringing waveform in the secondary winding through the auxiliary winding.

5. The switching mode power supply of claim 1 wherein the second control circuit is configured to ignore the damping ringing waveform when detecting the ringing waveform in the secondary winding through the auxiliary winding.

6. The switching mode power supply of claim 1 wherein the first control circuit comprises:
   a first terminal coupled to an output capacitor to receive the output voltage of the SMPS; and
   a second terminal coupled to secondary winding;
   wherein the first control circuit is configured to transfer electric charges from the output capacitor to the second winding when the output voltage is equal to or less than a reference voltage.

7. The switching mode power supply of claim 1 wherein the first control circuit comprises:
   a voltage divider coupled to the output voltage and configured to generated an attenuated voltage;
   a first comparator having:
      a first input terminal coupled to the attenuated voltage;
      a second input terminal coupled to the reference voltage; and
      an output terminal;
   a pulse generator coupled to the comparator; and
   a switch coupled to the pulse generator;
   wherein the pulse generator is configured to turn on the switch when the attenuated voltage is less than the reference voltage.

8. The switching mode power supply of claim 7 wherein the switch is a PMOS or an NMOS transistor.

9. The switching mode power supply of claim 7 wherein the switch is connected between a terminal of the secondary winding and an output terminal of the SMPS.

10. The switching mode power supply of claim 1 wherein the second control circuit comprises:
    a feedback terminal coupled to the auxiliary winding through a coupling network, the feedback terminal being configured to receive a feedback signal from the coupling network;
    a driver unit configured to drive the power switch;
    a sense current input terminal coupled to a terminal of the power switch;
    a control unit coupled to the sense current input terminal and the feedback terminal, the control unit configured to control the power switch for regulating the output of the SMPS; and
    a dynamic event detection circuit coupled to the feedback terminal and configured to detect the second electrical signal.

11. The switching mode power supply of claim 10 wherein the coupling network is a voltage divider network.

12. The switching mode power supply of claim 10 wherein the dynamic event detection circuit is configured to activate the driver unit for turning on the power switch for a predetermined time period upon detecting the electrical signal.

13. The switching mode power supply of claim 12 wherein the dynamic event detection circuit is configured to detect a ringing waveform in the auxiliary winding.

14. A switching mode power supply (SMPS), comprising:
    a transformer having:
       a primary winding for coupling to an input power source;
       a secondary winding for providing an output voltage of the SMPS; and an auxiliary winding;
a power switch coupled to the primary winding;
a first control circuit coupled to the secondary winding, the first control circuit being configured to provide a first electrical signal to the secondary winding when the output voltage of the SMPS is less than a reference voltage during a discontinuous time, whereupon a second electrical signal is induced in the auxiliary winding; and
a second control circuit coupled to the auxiliary winding and the power switch, the second control circuit being configured to regulate the output of the SMPS by controlling the power switch in response to a feedback voltage signal from the auxiliary winding, the second control circuit being further configured to turn on the power switch in response to the second electrical signal when the output of the SMPS is less than the reference voltage,
wherein the first electrical signal causes a ringing voltage waveform in the secondary winding after a damping ringing waveform in the secondary winding that follows a secondary current flow induced by a primary current.

15. The switching mode power supply of claim 14 wherein during the discontinuous time, substantially no energy is stored in the primary and secondary windings.

16. The switching mode power supply of claim 14 wherein the second control circuit is configured to detect the ringing waveform in the secondary winding through the auxiliary winding.

17. The switching mode power supply of claim 14 wherein the second control circuit is configured to ignore the damping ringing waveform when detecting the ringing waveform in the secondary winding through the auxiliary winding.

* * * * *